United States Patent [19]

Pickering et al.

[11] Patent Number: 4,760,700
[45] Date of Patent: Aug. 2, 1988

[54] MASTER CYLINDER FOR VEHICLE BRAKING SYSTEMS

[75] Inventors: John F. Pickering, Rugby, England; Peter Schlüter, Koblenz; Bernd Wagner, Ruescheid, both of Fed. Rep. of Germany

[73] Assignee: Lucas Industries Public Limited Company, Birmingham, England

[21] Appl. No.: 80,216

[22] Filed: Jul. 31, 1987

Related U.S. Application Data

[63] Continuation of Ser. No. 850,429, Apr. 8, 1986, abandoned, which is a continuation of Ser. No. 560,450, Dec. 12, 1983, abandoned.

[30] Foreign Application Priority Data

Dec. 14, 1982 [GB] United Kingdom ............... 8235575

[51] Int. Cl.⁴ ........................................... B60T 11/26
[52] U.S. Cl. ................................. 60/585; 92/169 R; 403/274; 403/326; 403/359
[58] Field of Search ............... 60/533, 585, 588, 592; 92/169.1; 403/274, 326, 359

[56] References Cited

U.S. PATENT DOCUMENTS

| | | | |
|---|---|---|---|
| 1,695,194 | 12/1928 | Lansinger | 60/592 |
| 2,213,946 | 9/1940 | Bowen | 60/588 |
| 3,121,583 | 2/1964 | Damm | 403/326 |
| 3,396,554 | 8/1968 | Westercamp | 403/274 |
| 3,479,068 | 11/1969 | Brittain | 60/585 |
| 4,474,005 | 10/1984 | Steer | 60/585 |
| 4,480,530 | 11/1984 | Holmes | 403/326 |
| 4,514,108 | 4/1985 | Sagady | 403/359 |

FOREIGN PATENT DOCUMENTS

| | | | |
|---|---|---|---|
| 65891 | 12/1982 | European Pat. Off. | 60/585 |
| 1196173 | 11/1959 | France | 60/585 |

Primary Examiner—Abraham Hershkovitz
Attorney, Agent, or Firm—Holman & Stern

[57] ABSTRACT

A master cylinder for an hydraulic pressure system has a pressure cylinder (1) on which is mounted a reservoir (11), the cylinder having an open end closed by a cap (3). The cap is positively coupled to the cylinder (1) by a coupling device (26) arranged so that resulting from pressure applied to the interior of the cap (3) is transmitted via said device to the cylinder.

9 Claims, 3 Drawing Sheets

MASTER CYLINDER FOR VEHICLE BRAKING SYSTEMS

This is a continuation of application Ser. No. 850,429, filed Apr. 8, 1986 now abandoned which in turn is a continuation of Ser. No: 560,450 filed Dec. 12, 1983 now abandoned.

This invention relates to a master cylinder for an hydraulic pressure system, primarily for a vehicle braking system, and more particularly to a master cylinder which includes a pressure cylinder having an open end, an initially separate reservoir mounted on the cylinder and communicating with the interior of the cylinder by means of a transverse opening through the peripheral cylinder wall, and a closure member mounted on the cylinder and closing said open cylinder end. Examples of this general kind of master cylinder are described in our co-pending published Application No. 2082277.

For safety reasons, it is common practice to test the integrity of newly assembled master cylinders by applying high pressure to the interior of the cylinder and checking for unacceptable leaks which may be caused, for example, by damaged or incorrectly assembled components such as pistons or seals. In some master cylinders, the closure member is retained in position by or conected to relatively flimsy structure such as a shell forming part of a booster body and the force transmitted through the closure member to such structure as a result of the application of the test pressure can lead to a risk of damage occurring to the structure.

An object of the present invention is to overcome the aforesaid problem and accordingly provides a master cylinder comprising a pressure cylinder having an open end, an initially separate reservoir communicating with the interior of the cylinder by means of a transverse opening through the peripheral cylinder wall, and a closure member mounted on the cylinder and closing said open cylinder end, the closure member being positively coupled to the cylinder body by a coupling device arranged so that force resulting from pressure applied to the interior of the closure member is transmitted via said means to the cylinder.

In one convenient arrangement, the coupling device extends through an opening formed in the closure member and engages a formation in the cylinder wall which provides at least one surface, and preferably two opposed surfaces against which axial force applied to the interior of said closure member may be reacted.

Preferably, said formation provides said surface of surfaces at either side of the cylinder and the coupling device has a pair of arms arranged to embrace the cylinder and respectively engage said surface of surfaces at either side thereof.

In an alternative arrangement, the coupling device is in the form of a ring having outwardly extending peripheral teeth which engage recesses formed respectively in the closure member and cylinder, said recesses providing respectively a pair of opposed surfaces against which axial force applied to the closure member may be reacted through the ring.

The invention will now be described, by way of example, with reference to the accompanying drawings in which.

Figure 1:
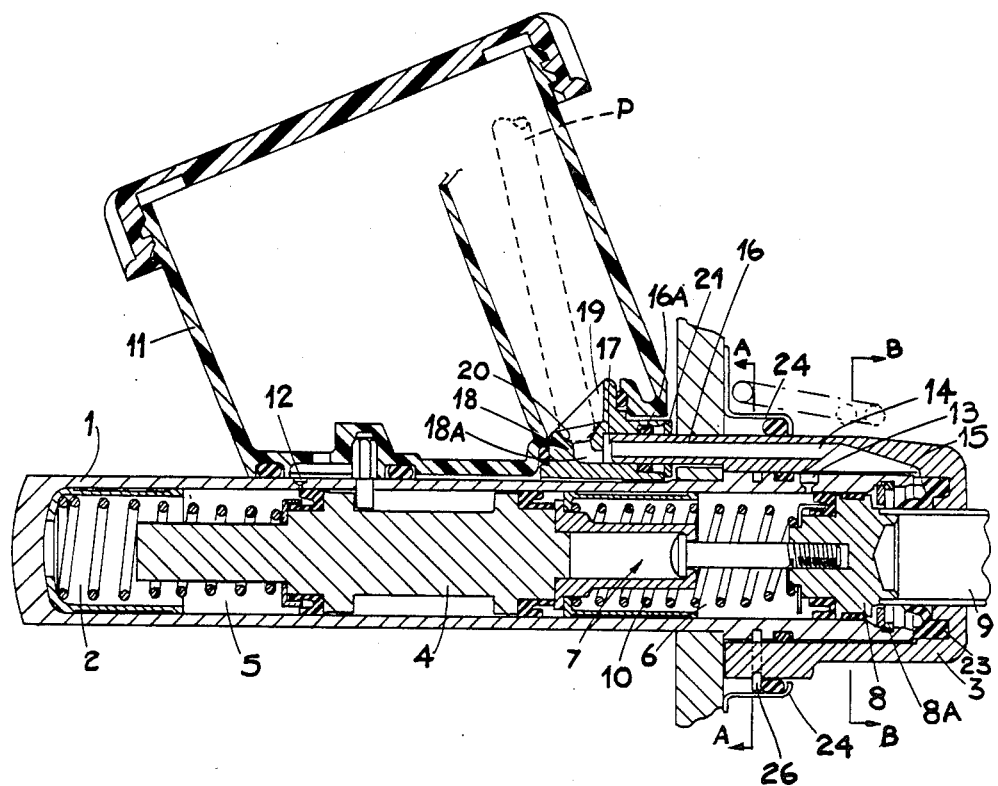
FIG. 1 is a longitudinal cross-section of one form of the master cylinder of the invention.

The drawings illustrate a tandem master cylinder for use in a dual circuit braking system and comprising a pressure cylinder 1 having an axial blind bore 2, the open end of which is closed by a closure member in the form of a sleeve 3. The bore 2 is divided by a piston 4 into pressure chambers 5 and 6, the piston being connected by a device 7 of variable length to another piston 8 to which is secured an actuating rod 9 extending axially outwardly of the cylinder. A spring 10 acts to axially separate the pistons 4 and 8 to an extent limited by the telescopic device 7. A reservoir 11 is mounted at the upper side of the cylinder 1 and communicates respectively with the chambers 5 and 6 through ports 12 and 13 formed transversely through the cylinder wall.

Figure 5:
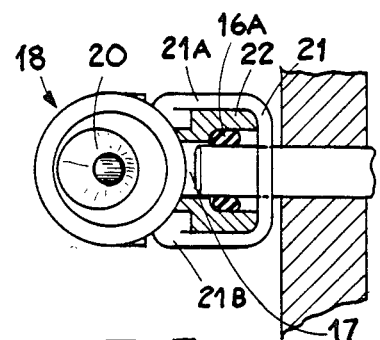
FIG. 5 is a detail in plan view of a component of the master cylinder of FIGS. 1 to 4.
Figure 4:
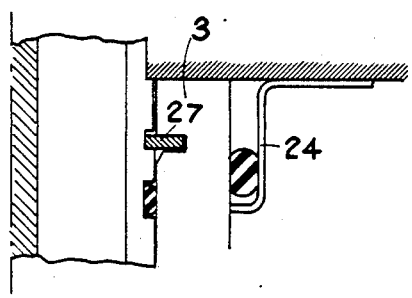

Communication between the reservoir and port 13 takes place by way of an axial passage 14 formed in the closure member 3, the passage 14 leading at one end into a recess 15 registering with the port 13. The passage 14 is formed partly in an axial extension 16 of the closure member, which extension is inserted into a bore portion 17 of a connector 18 which is received and sealed within an opening in the base of the reservoir 11. A seal 16A surrounds the extension 16 within the connector device 18 and is retained in position by a resilient clip 21, as of spring steel for example. As will be seen from FIG. 5, the clip is generally U-shaped in plan and embraces a boss portion 22 of the connector 28 with arms 21A, 21B thereof resiliently snap-engaged behind the boss portion. The extension 16 of the closure member 3 extends through the clip 21 for reception within the connector 18 as described.

The bore portion 17 communicates via a passsage 18A with an enlarged opening 19 of the connector located within the reservoir, the junction between the passage 18A and opening 19 being in the form of a conical seat 20 designed to permit the application of a high pressure test probe (indicated in broken lines at P) to the chamber 6 of the newly assembled master cylinder for the purpose of testing the integrity of the usual piston and seal components thereof. The conical seating permits the test probe a relatively wide angle of approach for connection with the connector 18 in order to facilitate its use.

Normal operation of the master cylinder described above will be readily apparent to one skilled in the art and will not be further described.

Before the master cylinder is approved for use in a vehicle braking system, the aforesaid pressure testing of the pressure chamber 6 is carried out using the probe P. It will be seen that the test pressure acts on the inner end of the piston 8 and the resultant force on the piston is reacted on a circlip 8A lodged in a groove in the cylinder wall. The test pressure also acts over a relatively large area of the closure member 3, defined by the annulus presented by a seal 23 surrounding the actuating rod 9 and it is important that the considerable force thus generated on the closure member is not applied to flimsy structure, such as a housing 24 of an associated servo, since this may result in damage to that structure.

Figure 2:
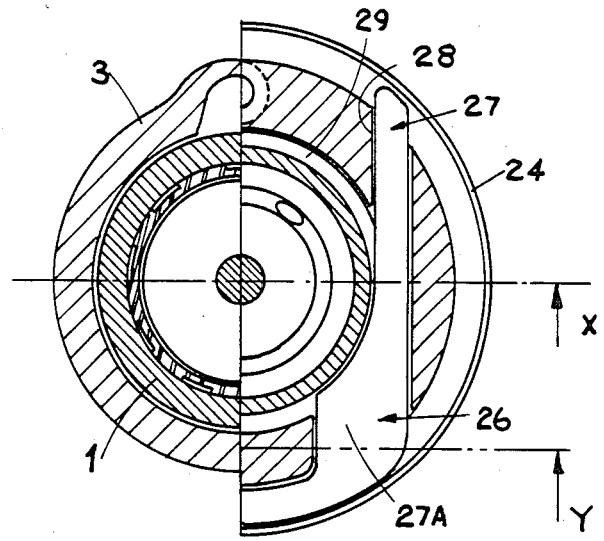
FIG. 2 is a split cross-section respectively on the lines A—A and B—B of FIG. 1.
Figure 3:
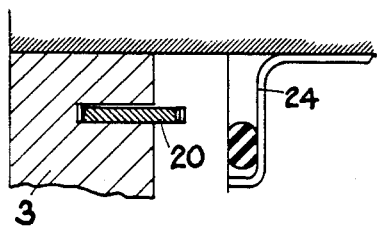
FIGS. 3 and 4 are respectively cross-sections along the lines Y and X of FIG. 2.

The invention provides a means for reacting this force on the cylinder 1 and, in the present embodiment, this is achieved by the use of a coupling device in the form of a generally U-shaped spring steel clip 26 (FIG. 2) the arms 27 of which extend through transverse openings 28 formed in the end closure 3 and engage in an annular groove 29 formed in the outer peripheral surface of the cylinder 1. Inner end portions 27A of the arms 27 are of greater width than the remainder of the arms so that the arms are able to engage in the groove 29 over a substantial part of the arcuate extent of the latter. This effectively keys the closure member 3 to the cylinder so that any axial force applied to the closure member 3, such as that resulting from the aforementioned high pressure testing, is reacted directly on the cylinder and not, for example, on the booster casing 24. The coupling device 26, in this embodiment, lies within the booster casing 24 and is retained in place thereby. It can therefore be fairly readily removed in order to permit the closure member 3 to be dismantled to provide access to the interior of the cylinder when required.

Figure 6:
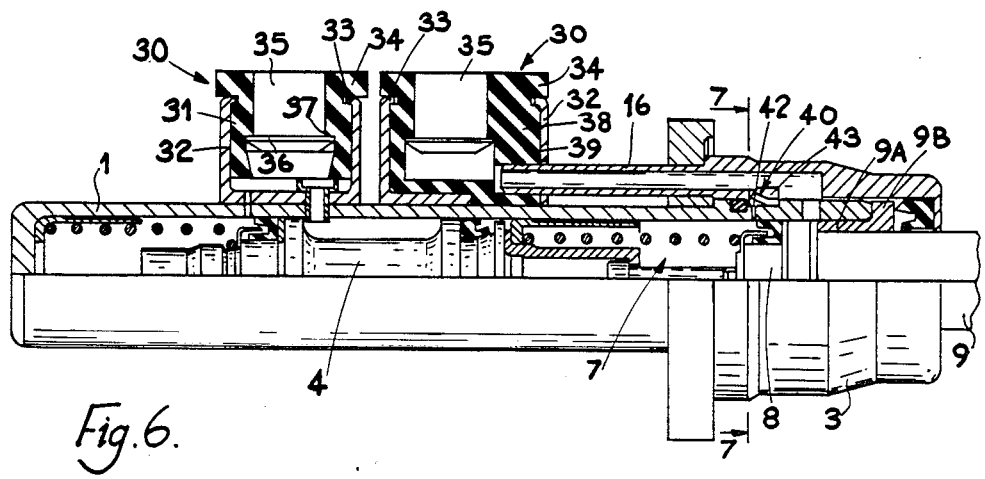
FIG. 6 is a longitudinal cross-section of an alternative form of the master cylinder of the invention.

The alternative embodiment illustrated in FIG. 6 has a cylinder 1 containing pistons 4 and 8, end cap 3, variable length device 7 and actuating rod 9 arranged and operating in a similar manner to the corresponding components of FIG. 1. The reservoir (not shown) is mounted, in this embodiment, on the cylinder 1 by means of flexible resilient plugs 30, each having a body 31 of generally hollow cylindrical form engaged within respective upstanding cylindrical cups 32 secured to the outer cylinder surface. The cups have inwardly turned flanges 33 at their outer peripheries which engage within peripheral grooves formed behined radially outwardly extending flanges 34 of the plugs to retain the plugs positively in position. Projecting spigots 35 of the reservoir are received within the plugs 36 with some resilient deformation of the latter to ensure a fluid-tight seal and end flanges 36 on the spigots engage behind shoulders 37 within the plugs for positive retention. One of the plugs 30 has a thickened wall portion 38 having a transverse bore 39 which receives an axial hollow extension 16 of the cap 3 similar to that of the previous embodiment.

Figure 7:
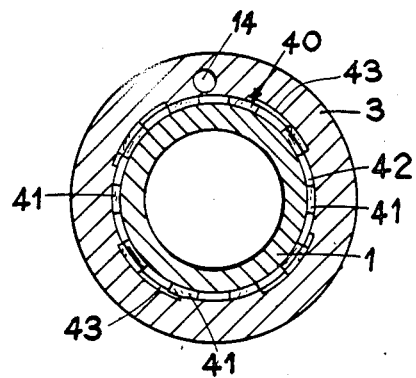
FIG. 7 is a cross-section along the line 7—7 of FIG. 6.

In this embodiment, the means for reacting axial force applied to the cap 3, resulting, for example, from pressure testing, is in the form of a locking ring 40 having a number of peripheral teeth 41 (FIG. 7) and housed in a groove 42 in the outer peripheral cylinder wall. The adjacent internal wall of the cap 3 has a plurality of internal recesses 43 within which those teeth f the locking ring in register with the recesses may engage.

The teeth 41 of the ring 40, when unstressed, project out of the peripheral plane of the ring. In order to assemble the cap 3 on the cylinder 1, the ring 40 is first placed in the cylinder groove 42 and as the cap is passed axially along the body to its position of use, the teeth 41 of the ring are resiliently compressed against the internal wall of the cap. When the cap recesses 43 come into register with the cylinder groove 42, the teeth in register with the recesses snap-engage therein to positively lock the cap on the cylinder in a manner which precludes its subsequent removal without damage to the assembly. This action brings oppositely facing edges of the ring into facing relationship with oppositely facing edge surfaces of the cap and cylinder, thereby ensuring that axial forces imposed on the cap are reacted directly on the cylinder.

In the arrangement as illustrated, pressure applied to the inner end of the piston 8 is transmitted directly to the cap 3 and when high pressure testing is envisaged, it may be desirable to incorporate a circlip similar to 8A in FIG. 1, or other device, to react force applied to said piston inner end.

In order to provide an additional bearing surface for the piston rod 9, a sleeve 9A is interposed between the outer surface of the rod and the inner surface of the cylinder, a radial flange 9B of the sleeve being disposed between the adjacent end of the cylinder and seal 23 to retain the sleeve in position. The sleeve 9A provides an elongate bearing surface for the rod 9 which assists in minimising tilting of the rod 9 and piston 8, in use. By leaving a small clearance Y between the cap and cylinder and also between the sleeve flange 9B and the cap, slight leakage of hydraulic fluid is permitted for the purpose of lubricating the seal 23.

We claim:

1. A master cylinder for a hydraulic pressure system comprising a pressure cylinder having a longitudinal axis, an open end, a reservoir communicating with the interior of the cylinder of means of a transverse opening through the peripheral cylinder wall, and a closure member mounted on the cylinder and closing said open cylinder end, the closure member being positively coupled to the cylinder body by a coupling device for transmitting force resulting from pressure applied to the interior of the closure member to the cylinder wherein the coupling device is in the form of a locking ring housed in a groove of the cylinder, the groove being formed circumferentially in an outer cylindrical wall of the cylinder which is parallel with said longitudinal axis, the locking ring having outwardly inclined resilient peripheral teeth extending radially outwardly from the groove, the closure member having an inner cylindrical wall fitting over the outer cylindrical wall of the cylinder, the inner cylindrical wall having means engaging said teeth to positively lock the closure member on the cylinder in a manner which precludes subsequent removal of the closure member and to transmit axial force applied to the interior of the closure member to the cylinder.

2. A master cylinder according to claim 1 wherein the coupling device extends through an opening formed in the closure member and engages a formation in the cylinder wall which provides at least one surface against which axial force applied to the interior of said closure member may be reacted.

3. A master cylinder according to claim 2 wherein said formation provides two opposed surfaces for the reaction of said forces.

4. A master cylinder according to claim 2 wherein said formation provides said surface or surfaces at either side of the cylinder and the coupling device has a pair of arms arranged to embrace the cylinder and respectively engage said surface or surfaces at either side thereof.

5. A master cylinder according to claim 4 wherein said arms extend through transverse openings in the closure member and engage in an annular groove of the cylinder, which groove constitutes said formation of which opposed walls provide said two opposed surfaces.

6. A master cylinder according to claim 5 wherein the coupling device is of general U-shape with inner end portions of the arms of greater width than the remainder, such that the arms are able to engage in the cylinder groove over a substantial part of the arcuate extent of the latter.

7. A master cylinder according to claim 1 wherein the teeth, when unstressed, project out of the peripheral plane of the ring, whereby the teeth are resiliently compressed as the member is passed axially along the cylinder and at least some of them snap-engage by resilient deformation into said internal recesses with which they are brought into register thereby positively to lock the closure member on the cylinder.

8. A master cylinder according to claim 1 wherein a bearing sleeve is interposed between the external peripheral surface of an axially extending actuating shaft of the cylinder and the internal cylinder wall to provide a bearing surface for said shaft.

9. A master cylinder according to claim 8 wherein said bearing sleeve has a peripheral radial flange which abuts the end of the cylinder.

* * * * *